United States Patent [19]

Wahlgren

[11] Patent Number: 4,813,479
[45] Date of Patent: Mar. 21, 1989

[54] ADJUSTABLE PARTICLE COOLER FOR A CIRCULATING FLUIDIZED BED REACTOR

[75] Inventor: Anders Wahlgren, Partille, Sweden

[73] Assignee: Götaverken Energy AB, Goteborg, Sweden

[21] Appl. No.: 128,914

[22] Filed: Dec. 4, 1987

[30] Foreign Application Priority Data

Dec. 11, 1986 [SE] Sweden .................. 86 05319

[51] Int. Cl.⁴ .................................... F28D 18/00
[52] U.S. Cl. ...................... 165/104.16; 110/245; 122/4 D
[58] Field of Search ............ 122/4 D; 165/1, 104.16; 110/245; 431/7, 170

[56] References Cited

U.S. PATENT DOCUMENTS

| | | |
|---|---|---|
| 4,111,159 | 9/1978 | Okuno et al. |
| 4,154,581 | 5/1979 | Nack et al. |
| 4,462,341 | 7/1984 | Strohmeyer, Jr. .............. 122/4 D |
| 4,469,050 | 9/1984 | Korenberg ..................... 122/4 D |
| 4,552,203 | 11/1985 | Chrysostome et al. ....... 122/4 D X |
| 4,709,662 | 12/1987 | Rawdon ......................... 122/4 D |

FOREIGN PATENT DOCUMENTS 0082673 6/1983 European Pat. Off. .

Primary Examiner—Edward G. Favors
Attorney, Agent, or Firm—Holman & Stern

[57] ABSTRACT

A method and a particle cooler for controlling the cooling effect in a circulating fluidized bed reactor. The method comprises regulating heat output from the particle cooler by varying the particle level in the cooler. The particle cooler is mounted in a fluidized bed reactor having a particle flow restrictor with fluidizing means between the flow restrictor and reaction chamber and provides the only particle flow passage between the restrictor and reaction chamber and is provided with internal cooling media tubes dispersed on different vertical levels. Particle flow regulating means is provided for maintaining the particle level within the cooler, which level is adjustable.

17 Claims, 1 Drawing Sheet

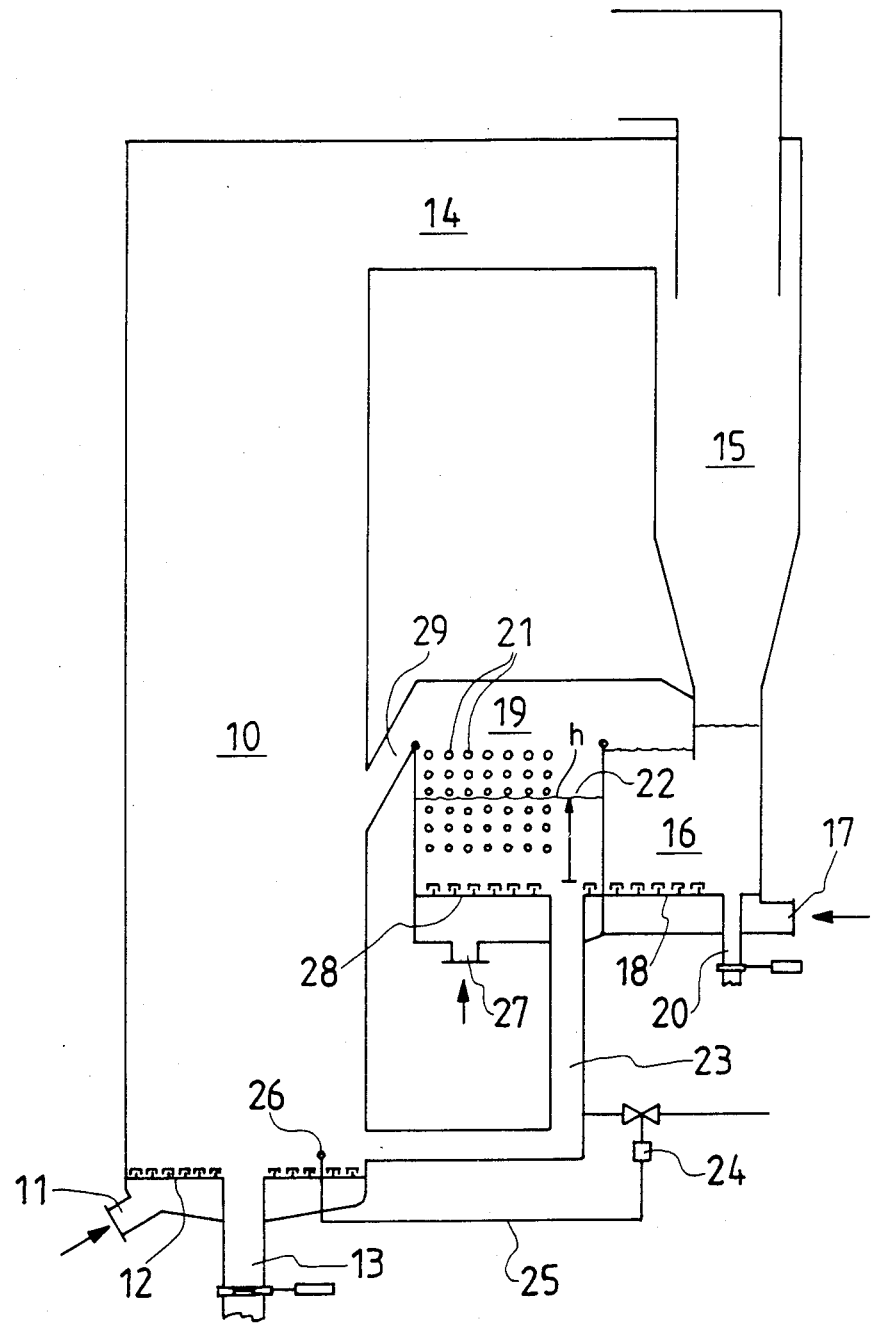

ADJUSTABLE PARTICLE COOLER FOR A CIRCULATING FLUIDIZED BED REACTOR

BACKGROUND

1. Field of the Invention

This invention relates to method and a particle cooler for controlling the cooling effect in a circulating fluidized bed reactor. The bed circulates through a reaction chamber, particle separator and a particle flow restrictor with fluidizing means.

2. Description of the Prior Art

Particle coolers of the above type are known, e.g. from European Patent Application EP No. 0093063 corresponding to U.S. Pat. No. 4,552,203, and are used to control the output of heat within the loop of reaction chamber—particle separator—reaction chamber, and/or regulation of operating temperature within the reaction chamber.

In known adjustable particle coolers, the particle flow coming from separators is divided into two separate streams; one stream is returned directly to the reaction chamber, and the other stream is led to the particle cooler. This splitting of the particle stream requires investments in the form of conduits and valves. One problem with known arrangements having divided particle steams, is dimensioning the size of the particle cooler. If the particle cooler is dimensioned for a small reduction of temperature in the particle stream (mixing temperature) at full heat output from the cooler, then a reduction in particle flow, e.g. when the load is reduced, will result in an initially increased reduction of temperature in the particle flow, but the heat output in the particle cooler will hardly be affected. The reduction in output will only be obtained after a substantial reduction in temperature difference ($T_{particle} - T_{coolant\ media}$). In order to avoid this control deficiency, the particle cooler may be dimensioned for a larger reduction of temperature in the particle stream, i.e. only a minor part of the total particle flow will be led through the particle cooler, even at full load. This leads to a better adjustability. However, one drawback is that a larger cooling surface is needed to compensate for the reduced driving temperature difference.

SUMMARY OF THE INVENTION

The object of the present invention is to provide a compact particle cooler having a relatively small heat absorbing surface, and which may be controlled by a single valve.

The method according to the invention is characterized in that the heat output from the particle cooler is regulated by variation of particle level in said cooler.

The particle cooler according to the invention is characterized in that it is mounted between the flow restrictor and the reaction chamber and provides the only particle flow passage between the restrictor and the reaction chamber, and in that it has internal cooling media tubes dispersed on different vertical levels, and includes particle flow regulating means for maintaining a particle level within the cooler, which level is adjustable.

According to one preferable embodiment of the invention, the particle cooler includes a by-pass passage for bed particles, between the flow restrictor and the cooling media tubes.

Preferably the particle cooler comprises fluidizing means.

According to another preferable embodiment of the invention, the particle cooler includes an overflow outlet, above the level of the cooling media tubes. If the inlet from the flow restrictor to the cooler is located so high above the overflow outlet, the particles may flow freely past the cooling media tubes when they are completely covered by particles. This makes it possible to close off the cooling surfaces, within the particle cooler, by closing the fluidizing gas to the particle cooler and closing the flow regulating means.

The flow regulating means is preferably non-mechanical.

BRIEF DESCRIPTION OF THE DRAWING

One embodiment of the invention will now be described in detail with reference to the accompanying drawing which is a schematic diagram of a reactor having a circulating fluidized bed combustion system comprising a reaction chamber, cyclone, flow restrictor and particle cooler in accordance with the objectives of this invention.

DETAILED DESCRIPTION

In the drawing reference 10 is a reaction chamber containing a furnace to which is supplied a fluidizing gas via an opening 11. A distribution plate 12 distributes the fluidizing gas over the bottom surface of the furnace and is provided with an outlet 13 for ash and used bed material. The fluidizing gas lifts the bed material, which contains fuel, lime stone, ash and sand, wherein the smaller of these particles are carried by means of the exhausts up through the reaction chamber 10 to an outlet 14 at the top of the chamber.

The majority of these particles are separated from the exhaust by means of a cyclone separator 15 and are collected at a flow restrictor 16 which prevents gas from flowing backwards from the furnace to the cyclone 15. The amount of particles present within the flow restrictor 16 is fluidized by means of gas which is supplied via an opening 17 and distributed via a plate 18, before it passes out into a particle cooler 19. The flow restrictor is also provided with a normally closed draining outlet 20.

The particle cooler 19 normally receives all material which is separated in the cyclone 15, and it is provided with a number of cooling media tubes 21 which are dispersed on different vertical levels within the cooler. A vertical by-pass passage 22 is provided between the tubes and the flow restrictor, which allows all bed material coming from the flow restrictor 16 to bypass the cooling tubes 21 without contacting them. The passage 22 transcends into a conduit 23 which forms an L-valve and leads to the bottom of the reaction chamber.

Gas is supplied to the L-valve via a control means 24 which enables a precise control of the particle flow. The control means 24 is connected via an electrical wire 25 to a temperature sensor 26 within the reaction chamber 10. This sensor detects the temperature within the furnace. The above described system makes it possible to vary the amount of particles within the particle cooler, so that more or less of the tubes 21 are in contact with the hot material.

The temperature of the material which is recycled to the reaction chamber 10 can thus be varied and therefore the temperature within the chamber may be varied. Normally the particles have a temperature of about 850°

C. and they are also fluidized by means of a gas which is supplied to the cooler 19 via an opening 27 and distributed via a plate 28.

An alteration in bed temperature within the chamber 10, e.g. as a result from a change in load, will automatically initiate an alteration of particle level h within the cooler 19 via the sensor 26 and the control means 24. This will cause the flow through the conduit 23 to change momentarily. When the particle level in the cooler 19 has been adjusted to the new situation, the flow in the conduit 23 will return to normal, i.e. equal to the flow from the flow restrictor 16. When the load is increased, the level will rise within the cooler, through a momentary reduction in flow, until the desired level and output is achieved.

Since the entire bed material flow always passes through the particle cooler 19, the temperature reduction in the particles will be relatively small, as the temperature difference ($T_{particle} - T_{coolant\ media}$) is large when compared to conventional techniques wherein a partial flow to the cooler is adjusted. Besides, the output from the particle cooler will be directly proportional to the particle level h.

The particle cooler 19 is provided with an overflow outlet 29 leading to the reaction chamber 10. When the particle cooler is used at its maximum, possible surplus flow may pass out through the overflow outlet 29, which acts as a safety valve against overfilling.

The invention is not limited to the above described embodiment, but several modifications are possible within the scope of the appended claims. For example, mechanical valves may substitute for the L-valve within the conduit 23 and other means than the sensor 26 may be used for control of the particle level h.

I claim:

1. In a reactor including a fluidized bed reaction chamber having an outlet, a particle separator means connected to the reaction chamber outlet for separating particles passing through the reaction chamber outlet, a particle outlet for the separator means, return conduit means for recycling particles from the separator means to the reaction chamber and a particle cooler for cooling particles from the separator means, the improvement comprising:
   a flow restrictor connected to the particle outlet of the separator means;
   fluidizing means operatively connected to said flow restrictor for fluidizing particles in said flow restrictor;
   an outlet for said flow restrictor;
   a particle cooler having an inlet connected to said flow restrictor outlet and an outlet connected to the return conduit means so that said particle cooler is in the only flow passage between said flow restrictor and reaction chamber;
   cooling media tubes disposed in spaced relationship in said particle cooler for cooling particles in said particle cooler; and
   particle flow regulating means for adjusting and maintaining a particle level in said particle cooler.

2. The improvement as claimed in claim 1 and further comprising:
   a by-pass passage in said particle cooler for by-passing particles passing through said particle cooler without contacting said cooling media tubes.

3. The improvement as claimed in claim 1 and further comprising:
   fluidizing means operatively connected to said particle cooler for fluidizing particles therein.

4. The improvement as claimed in claim 1 wherein:
   said cooling media tubes are disposed on different vertical levels; and
   an overflow outlet is provided in said particle cooler above the level of said cooling media tubes for returning excess particles in said particle cooler to the reaction chamber.

5. The improvement as claimed in claim 1 wherein:
   said flow regulating means is non-mechanical.

6. The improvement as claimed in claim 1 wherein:
   said flow regulating means comprises:
   gas inlet means for supplying gas to the return conduit between the particle cooler and reaction chamber; and
   control means for controlling gas flow in said gas inlet means.

7. The improvement as claimed in claim 6 wherein:
   said flow regulating means further comprises:
   temperature sensor means in the reaction chamber operatively connected to said control means for controlling said control means.

8. The improvement as claimed in claim 1 wherein:
   said flow regulating means comprises:
   means for controlling the temperature of particles recycled to the reaction chamber from the particle cooler.

9. The improvement as claimed in claim 8 wherein:
   said temperature controlling means comprises:
   gas inlet means for supplying gas to the return conduit between the particle cooler and reactor chamber; and
   control means for controlling gas flow in said gas inlet means.

10. The improvement as claimed in claim 9 wherein:
    said temperature controlling means further comprises:
    temperature sensor means in the reaction chamber operatively connected to said control means for controlling said control means.

11. The improvement claimed in claim 10 and further comprising:
    fluidizing means operatively connected to said particle cooler for fluidizing particles in said particle cooler.

12. In a method for controlling the temperature of a reaction in a fluidized bed reaction chamber wherein particles in the exhaust from the reaction chamber are recycled through a particle cooler to the reaction chamber, the improvement comprising:
    regulating heat output from the particle cooler by regulating the particle level therein.

13. The improvement as claimed in claim 12 and further comprising:
    passing all recycled particles through the particle cooler.

14. The improvement as claimed in claim 13 and further comprising:
    passing all recycled particles through a flow restrictor prior to the particle cooler.

15. The improvement as claimed in claim 14 and further comprising:
    fluidizing the particles in the flow restrictor and the particle cooler.

16. The improvement as claimed in claim 12 wherein:
    said regulating step comprises:

passing particles from the particle cooler through a return conduit between the particle cooler and reaction chamber;
feeding gas into said return conduit; and
controlling the flow of gas into said return conduit to control the flow of particles therethrough.

17. The improvement as claimed in claim 16 and further comprising:
sensing the temperature in the reaction chamber; and
controlling the flow of gas into the return conduit in response to said temperatures.

* * * * *